US011082585B1

(12) United States Patent
Scrutton et al.

(10) Patent No.: US 11,082,585 B1
(45) Date of Patent: Aug. 3, 2021

(54) VISUAL CONTENT PROOFING ON MULTIPLE TARGET DEVICES

(71) Applicant: Adobe Inc., San Jose, CA (US)

(72) Inventors: Michael Scrutton, Fremont, CA (US); Sugato Majumdar, Uttar Pradesh (IN); Malay Barik, Uttar Pradesh (IN); Bhavna Sardana, Haryana (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/861,502

(22) Filed: Apr. 29, 2020

(51) Int. Cl.
*H04N 1/60* (2006.01)

(52) U.S. Cl.
CPC ......... *H04N 1/6052* (2013.01); *H04N 1/6063* (2013.01); *H04N 1/6097* (2013.01)

(58) Field of Classification Search
CPC ... H04N 1/6052; H04N 1/6063; H04N 1/6097
See application file for complete search history.

(56) References Cited

U.S. PATENT DOCUMENTS

| | | | | | |
|---|---|---|---|---|---|
| 5,416,890 | A | * | 5/1995 | Beretta | G06F 3/04845 345/440 |
| 5,987,165 | A | * | 11/1999 | Matsuzaki | H04N 1/6058 382/162 |
| 6,043,909 | A | * | 3/2000 | Holub | G01J 3/50 348/E17.004 |
| 6,459,425 | B1 | * | 10/2002 | Holub | G01J 3/02 345/207 |
| 2001/0038468 | A1 | * | 11/2001 | Hiramatsu | H04N 1/603 358/518 |
| 2003/0020727 | A1 | * | 1/2003 | Newman | H04N 1/6052 345/604 |
| 2008/0204829 | A1 | * | 8/2008 | Harrington | H04N 1/6094 358/504 |
| 2009/0231646 | A1 | * | 9/2009 | Yamauchi | H04N 1/6058 358/523 |
| 2010/0177366 | A1 | * | 7/2010 | Mestha | H04N 1/6058 358/518 |

(Continued)

OTHER PUBLICATIONS

Adobe, "Proofing Colors", https://helpx.adobe.com/photoshop/using/proofing-colors.html, Feb. 15, 2017, accessed Apr. 24, 2020, 8 pages.

(Continued)

*Primary Examiner* — Ted W Barnes
(74) *Attorney, Agent, or Firm* — Kilpatrick Townsend & Stockton LLP

(57) ABSTRACT

In some embodiments, a visual content proofing system obtains visual content for proofing and a list of multiple target devices. The visual content is to be rendered by each of the multiple target devices. For each of the multiple target devices, the visual content proofing system determines a supported color region in a reference color space according to a color profile of the target device. The visual content proofing system further determines a commonly supported color region in the reference color space for these multiple target devices and a design device used for designing the visual content. By using the commonly supported color region, unsafe colors in the visual content can be determined and be replaced with safe colors to generate a revised visual content which can be rendered accurately by all of these target devices.

20 Claims, 5 Drawing Sheets

(56) References Cited

U.S. PATENT DOCUMENTS

| | | | |
|---|---|---|---|
| 2011/0141497 A1* | 6/2011 | Willamowski | H04N 1/00408 358/1.9 |
| 2012/0057176 A1* | 3/2012 | Robinson | H04N 1/60 358/1.9 |
| 2013/0148140 A1* | 6/2013 | Bateman-Jones | G06K 15/1822 358/1.9 |
| 2013/0293606 A1* | 11/2013 | Maltz | H04N 1/6033 347/9 |
| 2015/0237320 A1* | 8/2015 | Takahashi | H04N 9/67 348/708 |

OTHER PUBLICATIONS

Mcdowell, David Q., "Reference Printing Conditions: Where Can it Lead Us/", TAGA 2002, 14 Pages.

Chromix, Inc., Colorthink, ColorThink Pro Has Arrived, http://www2.chromix.com/colorthink/, Oct. 2019, accessed Apr. 24, 2020, 2 pages.

\* cited by examiner

VISUAL CONTENT PROOFING ON MULTIPLE TARGET DEVICES

TECHNICAL FIELD

This disclosure relates generally to computer-implemented methods and systems for computer graphics processing. Specifically, the present disclosure involves proofing visual content, such as images, against multiple target devices.

BACKGROUND

Visual artwork is often created by a designer using a device that is not used for rendering the visual artwork. For example, a designer may use a computer device to design a poster image which is later rendered by a printer and printed on poster paper using a printing device. The rendered visual artwork may have color fidelity issues if the rendering device has a different color capability from the device used for designing the visual artwork. As a result, some colors in the visual artwork cannot be rendered as designed.

Proofing involves a process of simulating the appearance of the visual artwork when rendered by a target rendering device to identify colors that cannot be rendered by the target rendering device, referred to herein as "unsafe colors." The identified unsafe colors in the visual artwork can then be adjusted so that the adjusted colors are no longer unsafe colors for that target rendering device. Oftentimes, a visual artwork needs to be rendered by different types of rendering devices, such as printed using different printers or displayed using different display devices. As such, the proofing needs to be performed for each of the target rendering devices. Existing proofing methods perform proofing for one target rendering device at a time. As a result, each time a proofing is performed against a target rendering device, the visual artwork needs to be examined to determine if new color adjustments made for this target rendering device are safe against previously proofed target rendering devices. This process is time-consuming and computationally inefficient.

SUMMARY

Certain embodiments involve simultaneously proofing visual content against multiple target rendering devices. In one example, a visual content proofing system obtains visual content for proofing and a list of multiple target devices. The visual content is to be rendered by each of the multiple target devices. For each of the multiple target devices, the visual content proofing system determines a supported color region in a reference color space according to a color profile of the target device. The visual content proofing system further determines a commonly supported color region in the reference color space for these multiple target devices and a design device used for designing the visual content. By using the commonly supported color region, unsafe colors in the visual content can be determined and be replaced with safe colors to generate a revised visual content which can be rendered accurately by all of these multiple target devices.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
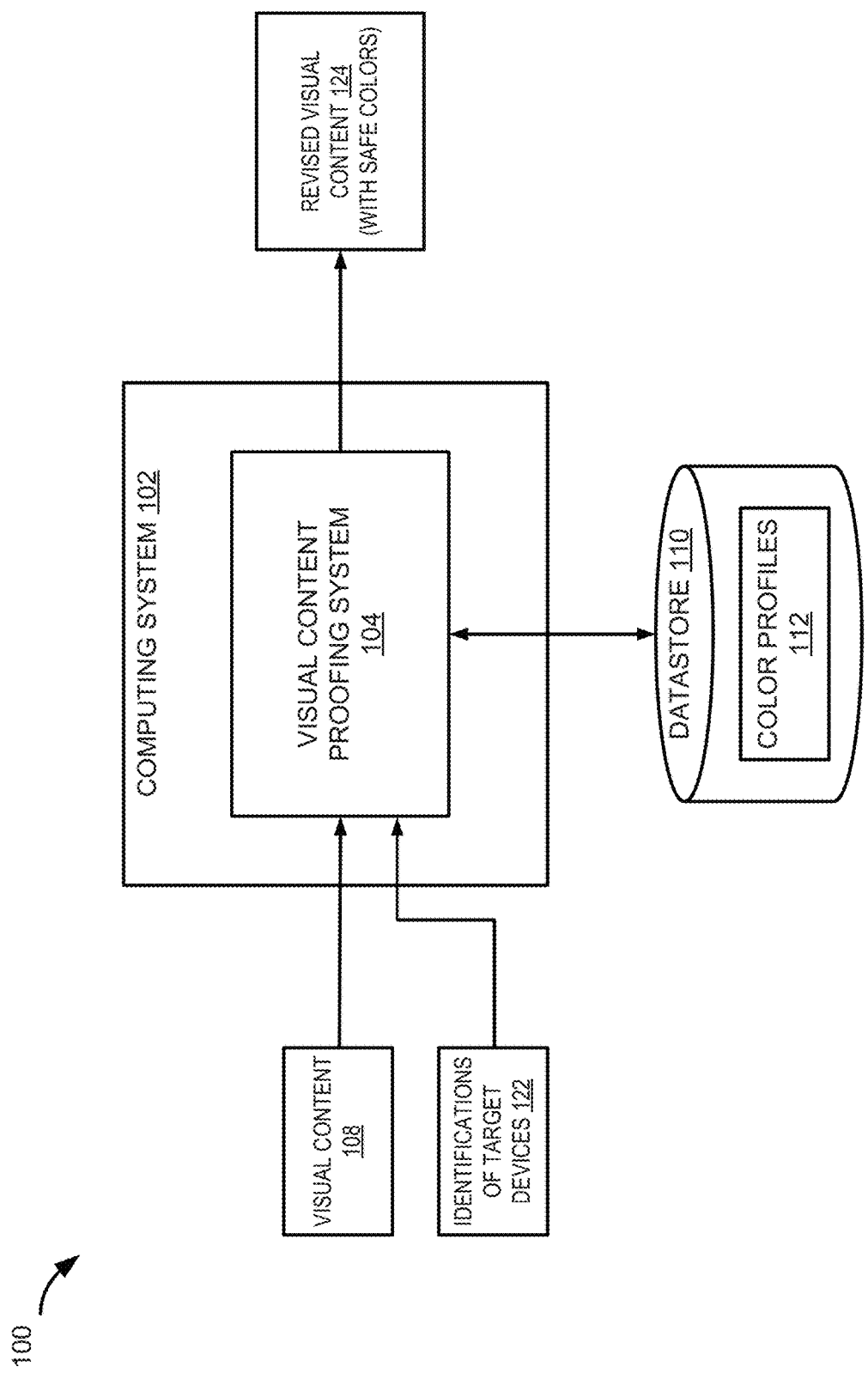
FIG. 1 depicts an example of a computing environment for simultaneously proofing a visual content against multiple target rendering devices, according to certain embodiments of the present disclosure.

The present disclosure involves simultaneously proofing visual content against multiple target rendering devices. Proofing involves a process of simulating the appearance of the visual content when presented or rendered by a target rendering device (also referred to herein as a "target device") to identify colors that cannot be rendered by the target rendering device (i.e., "unsafe colors"). Rendering involves a process of producing the visual content in a form appropriate for the target device as designed, such as printing the visual content by a target printer device or displaying the visual content by a target display device. As discussed above, existing proofing methods allow only one target rendering device to be evaluated at a time causing multiple rounds of color adjustments on the visual content when more than one target rendering device is involved. Certain embodiments described herein address these limitations by simultaneously proofing visual content against multiple target rendering devices. For instance, a visual content proofing system can be configured to obtain the color profiles of the multiple target devices and identify a commonly supported color region among these multiple target devices and a design device used for designing the visual content. The colors of the visual content that fall outside the commonly supported color region are identified as unsafe colors because these colors cannot be produced on some of the target devices. The identified unsafe colors in the visual content can be replaced with safe colors to generate a revised visual content. The revised visual content can be rendered as designed by all of these multiple target devices.

The following non-limiting example is provided to introduce certain embodiments. In this example, a visual content proofing system receives visual content for proofing. The visual content can be an image, a video, or a three-dimensional model. The visual content proofing system further receives identifications of multiple target devices for which the proofing is to be performed. Based on the identifications of these target devices, the visual content proofing system obtains a color profile for each of the target devices. The color profile of a device describes the colors supported by the device and the corresponding colors of the supported colors in a reference color space. Based on the color profiles of the target devices, the visual content proofing system determines a supported color region for each target device in a reference color space. The visual content proofing system further determines a commonly supported color region by these target devices and a design device used for designing the visual content. The commonly supported color region can be identified by obtaining an intersection of the supported color regions of these target devices and the design device.

The colors of the visual content that fall outside the commonly supported color region are identified as unsafe colors because these colors cannot be produced by at least one target device. Those colors falling inside the commonly supported color region are identified as safe colors and can be rendered accurately by all of the examined target devices. The visual content proofing system further generates indications of the unsafe colors for the visual content. These indications of the identified unsafe colors can be presented in the visual content on the design device. Replacement colors of the unsafe colors can be obtained to replace the unsafe colors in the visual content so that all the colors in the visual content fall inside the commonly supported color region. The replacement colors can be received from the designer or be determined by the visual content proofing system. The visual content proofing system replaces the unsafe colors with safe replacement colors to generate a revised visual content. The revised visual content can be rendered as designed by all the examined target devices.

As described herein, certain embodiments provide improvements in computer graphics processing by proofing visual content against multiple target rendering devices simultaneously. This eliminates the multiple rounds of color adjustments normally involved in the multi-device proofing process thereby improving the efficiency of the entire proofing process and also reducing the computational operations involved in the proofing process.

Example Operating Environment for Multi-Device Visual Content Proofing

Referring now to the drawings, FIG. 1 depicts an example of a computing environment 100 for proofing a visual content 108 against multiple target rendering devices simultaneously. The computing environment 100 includes a computing system 102, which can include one or more processing devices that execute a visual content proofing system 104 to perform the proofing. The computing environment 100 further includes a datastore 110 for storing data used in the proofing, such as color profiles of the multiple target rendering devices and a device used for designing the visual content 108 (referred to herein as a "design device").

The visual content proofing system 104 can receive a visual content 108 to be proofed against multiple target rendering devices. A target rendering device, also referred to as a target device, is a device, other than the device used to create the visual content, by which the visual content 108 is to be rendered. A target rendering device can be a printing device configured for printing the visual content, a dyeing device configured for dyeing a fabric according to the visual content, or a display device configured for displaying the visual content or any other device by which the visual content is rendered or otherwise displayed. The visual content 108 contains multiple colors and is created by a designer on a design device. In some examples, the computing system 102 is the design device. The visual content proofing system 104 can further receive identifications of multiple target devices 122. For example, the identification of a target device can include a model number of the target device, a serial number of the model device, or any other identification that can be used to obtain a color profile of the target device.

Based on the identifications of the target devices, the visual content proofing system 104 obtains the color profiles 112 for these devices. For example, the visual content proofing system 104 can query the datastore 110 using the identifications to retrieve the color profiles 112. The visual content proofing system 104 can also prompt a user of the computing system 102 to upload or otherwise provide means to access the color profiles 112. The visual content proofing system 104 also obtains the color profile of the design device used to design the visual content 108. The color profile 112 of a device describes the colors supported by the device and the corresponding colors of the supported colors in a reference color space. The reference color space can be the CIELAB color space, the HunterLab color space, the XYZ color space, a red-green-blue (RGB) color space, or any color space known in the art.

Based on the color profiles of the target devices, the visual content proofing system determines a supported color region for each target device and the design device in the reference color space. The visual content proofing system further determines a commonly supported color region by these multiple target devices and the design device. The commonly supported color region includes the colors that are supported by all the target devices and the design device. The commonly supported color region can be identified by calculating the intersection of the supported color regions of all the devices in consideration. Additional details on determining the commonly supported color region are provided with regard to FIG. 2-4.

Based on the commonly supported color region, the visual content proofing system 104 can determine unsafe colors as the colors in the visual content 108 falling outside the commonly supported color region. A color falling outside the commonly supported color region indicates that this color is not supported by at least one target device and thus cannot be reproduced or rendered accurately by at least that device. As such, these unsafe colors should be replaced with safe colors that fall inside the commonly supported color region in order for the visual content 108 to be rendered by all the target devices as designed.

To obtain the replacement colors for the unsafe colors, the visual content proofing system 104 can generate indications of the unsafe colors and present the visual content 108 on the design device with the indications of the unsafe colors in a user interface and allow the designer to choose the replacement colors. Alternatively, or additional, the visual content proofing system 104 can calculate the replacement colors for the unsafe colors. By replacing the unsafe colors with safe replacement colors, a revised visual content 124 is generated which can be rendered accurately by all of the target devices evaluated during the proofing. Additional details regarding the multi-device visual content proofing are described herein with respect to FIGS. 2-4.

Figure 2:
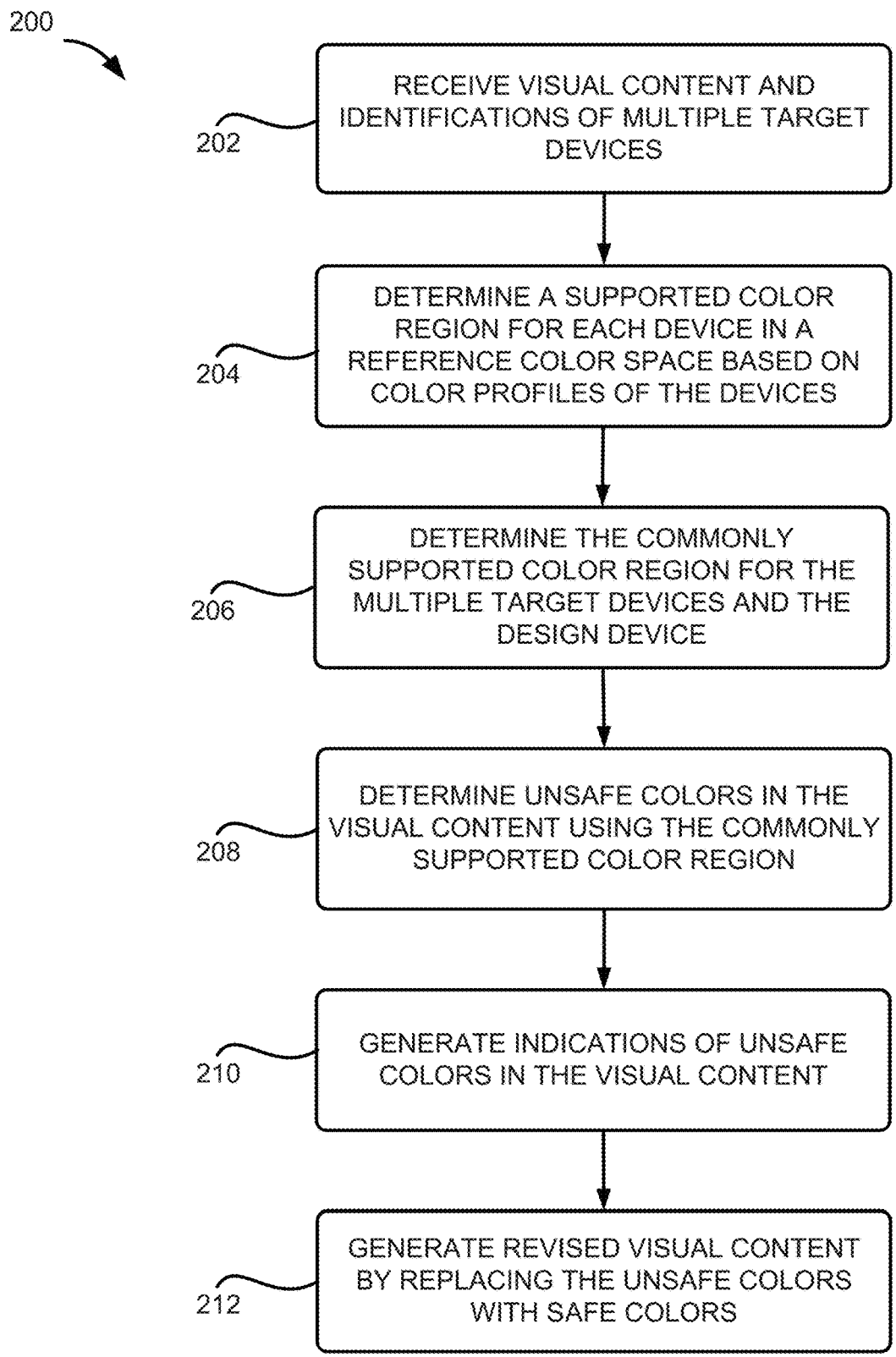
FIG. 2 depicts an example of a process for simultaneously proofing a visual content against multiple target rendering devices to generate a revised visual content that is safe for these multiple target rendering devices, according to certain embodiments of the present disclosure.

Examples of Computer-Implemented Operations for Multi-Device Visual Content Proofing FIG. 2 depicts an example of a process 200 for simultaneously proofing a visual content 108 against multiple target rendering devices, according to certain embodiments of the present disclosure. FIG. 2 is described in conjunction with FIG. 3 where an example of a commonly supported color region of two devices is depicted and FIG. 4 where examples of an image showing indications of unsafe colors and a revised image containing only safe colors are depicted. One or more computing devices (e.g., the computing system 102) implement operations depicted in FIG. 2 by executing suitable program code (e.g., the visual content proofing system 104). For illustrative purposes, the process 200 is described with reference to certain examples depicted in the figures. Other implementations, however, are possible.

At block 202, the process 200 involves receiving visual content 108 to be proofed against multiple target devices and identifications of these multiple target devices. For instance, the visual content proofing system 104 can receive the visual content 108 by a user (e.g., a designer of the visual content 108) operating in a user interface presented by the visual content proofing system 104 to select or otherwise specify the visual content 108. The visual content proofing system 104 might also receive the visual content 108 from another application executing on the computing system 102 (such as a visual content manipulation application) or another computing system. In some implementations, the visual content proofing system 104 might be a component of a visual content manipulation application used for designing the visual content 108 and be invoked when the visual content 108 is being edited in the visual content manipulation application. The visual content 108 might be stored locally on the computing system 102 or sent to the visual content proofing system 104 via a network.

The identification of a target device can include a model number of the target device, a serial number of the model device, or any other identification that can be used to uniquely identify the color profile of the target device. Similar to the visual content 108, the visual content proofing system 104 can receive the identifications of the target devices by the user operating in a user interface presented by the visual content proofing system 104 to select, input, or otherwise specify the multiple target devices.

At block 204, the process 200 involves determining a supported color region for each target device in a reference color space based on the color profile 112 of each device. The visual content proofing system 104 can use the identification of a target device to determine the color profile 112 of the target device. The color profile 112 of a device describes the colors supported by the device and the corresponding colors of the supported colors in a reference color space. The reference color space can be the CIELAB color space, the HunterLab color space, the XYZ color space, a red-green-blue (RGB) color space, or any color space known in the art. In some examples, the color profile can be described as a table mapping the supported colors to the corresponding colors in the reference color space. If the reference color spaces used in the color profiles of the multiple target devices are different, the color profiles can be converted to the same reference color space through mappings between the different color spaces. The visual content proofing system 104 also obtains the color profile of the design device that is used to design and edit the visual content 108. In some examples, the computing system 102 may be the device executing the application used for designing the visual content 108 and thus is a design device.

Figure 3:
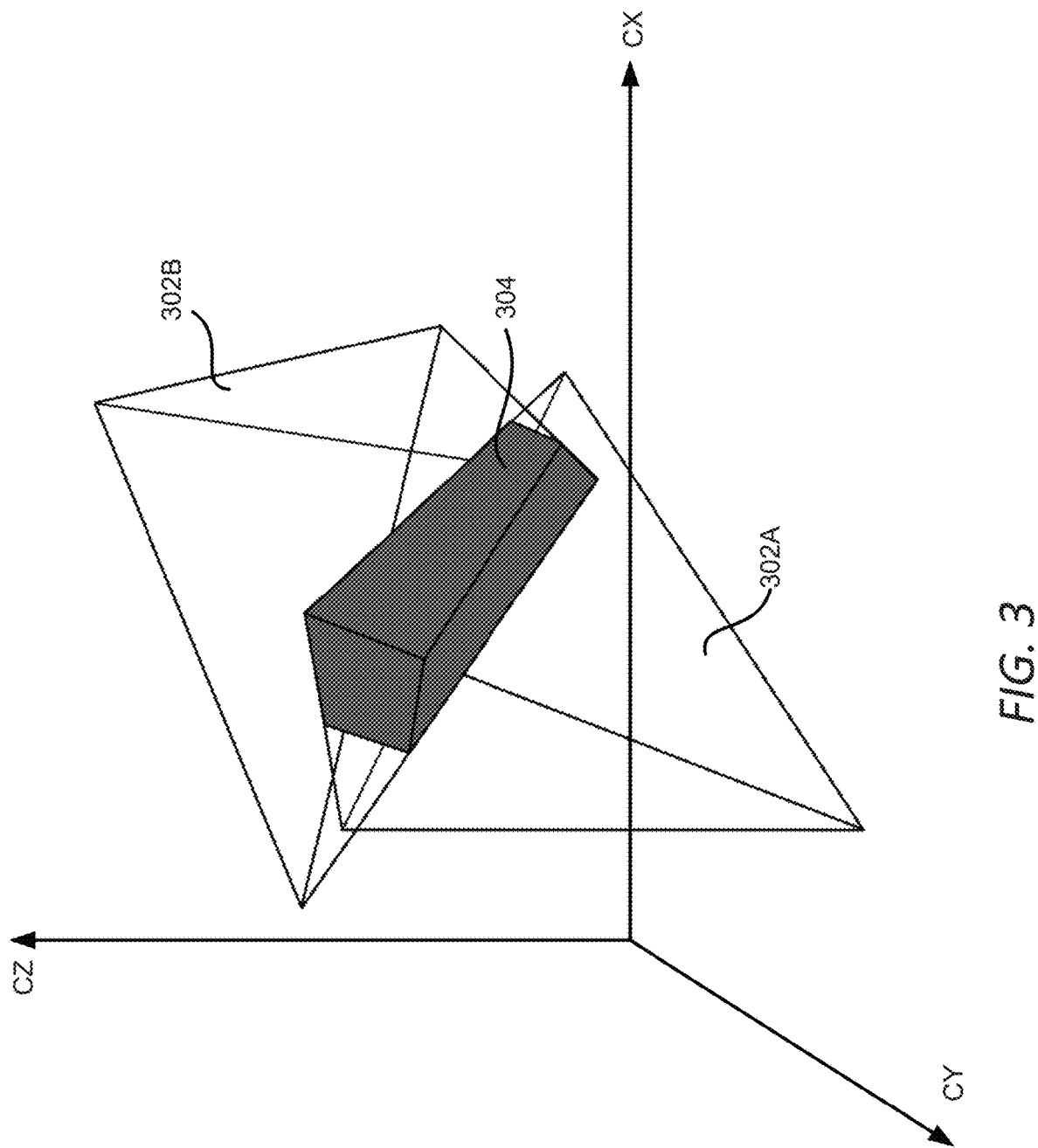
FIG. 3 depicts an example of a commonly supported color region of two devices, according to certain embodiments of the present disclosure.

In some examples, the colors supported by each device as indicated in the color profiles of the devices can be represented as a region in the three-dimensional reference color space. This region is referred to as the supported color region of a corresponding device. FIG. 3 shows the supported color regions of two devices (two target devices or a target device and the design device) in the reference color space. The three axes of the color space are denoted as CX, CY, and CZ, which can represent different components of the reference color space depending on the selected reference color space.

In FIG. 3, the three-dimensional region 302A is the supported region for one device and the three-dimensional region 302B is the supported color region for another device.

At block 206, the process 200 involves determining a commonly supported color region for the multiple target devices and the design device. The commonly supported color region can be identified by obtaining an intersection of the supported color regions of these target devices and the design device. FIG. 3 shows a commonly supported color region 304 for two devices whose supported color regions are regions 302A and 302B, respectively. The commonly supported color region 304 contains colors that belong to both the supported color region 302A and the supported color region 302B.

The intersection of the supported color regions of the devices can be calculated using algorithms such as the alpha shape method. In this method, the volume of the commonly supported color region is computed by summing the volumes of all tetrahedra that belong to the alpha-shape. The visual content proofing system 104 calculates the supported regions V(A) and V(B) of alpha-shapes based on two separate color profiles for two devices. The visual content proofing system 104 further calculates the combined color region V(A|B), i.e., the union of the two supported color regions A and B. The commonly supported color region can be found as V(A)+V(B) −V(A|B). This process can be repeated until the color profiles for all the devices are examined. The visual content proofing system 104 can store the commonly supported color region, for example, in the datastore 110.

At block 208, the process 200 involves determining unsafe colors in the visual content using the commonly supported color region. In some examples, an unsafe color can be determined by determining whether a color in the visual content is inside the commonly supported color region or not. If a color of the visual content falls outside the commonly supported color region, it means that this color cannot be rendered accurately by at least one of the target devices and thus it is an unsafe color. If a color of the visual content falls inside the commonly supported color region, this color can be rendered by all the target devices being examined and thus it is a safe color.

At block 210, the process 200 involves generating indications of the unsafe colors in the visual content for display. The indications can be added or otherwise embedded in the visual content 108. For example, the visual content proofing system 104 can replace the values of elements in the visual content that have an unsafe color with a pre-determined value to generate a markup visual content. For an image visual content, the image pixels having an unsafe color can be set to a pre-determined intensity value without color information. As a result, the pixels whose colors are unsafe are marked as gray pixels in the markup image visual content. In another example, the indications can include a binary flag matrix having the same resolution as the visual content 108. In the binary flag matrix, locations corresponding to the unsafe colors in the visual content can be flagged as 1; whereas safe colors are flagged as 0. Various other types of indications can also be generated.

Figure 4:
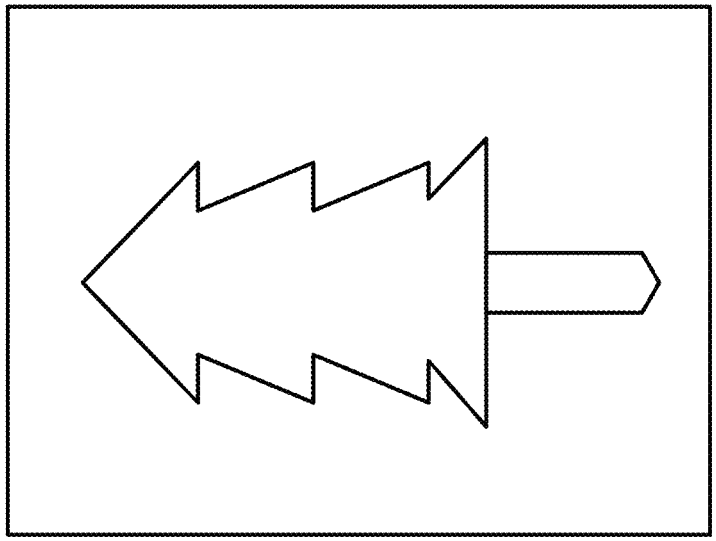
FIG. 4 depicts an example of an image with unsafe colors identified and a revised image that does not contain unsafe colors, according to certain embodiments of the present disclosure.
Figure 4:
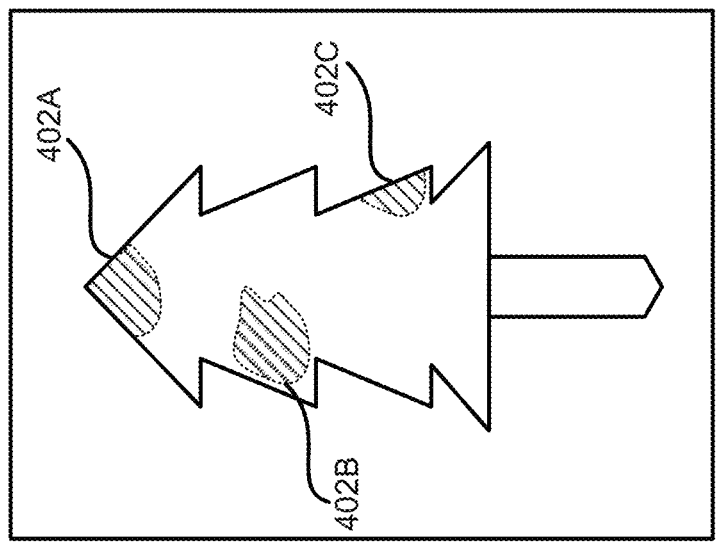

At block 212, the process 200 involves generating a revised visual content 124 by replacing the unsafe colors in the visual content 108 with safe colors. For example, the visual content proofing system 104 can present, or cause to be presented, the visual content along with the indications of unsafe colors in a user interface on a display device, such as the design device used for designing the visual content 108. In the example where the indications of the unsafe colors are embedded in the markup visual content, the markup visual content is displayed on the display device. In the example where the indications of unsafe colors include a separate flag matrix, displaying the visual content 108 can be performed by incorporating the flag matrix with the visual content 108 so that the elements of the visual content 108 having the unsafe colors are visible on the display device. FIG. 4 depicts an example of an image 408 with unsafe colors identified and a revised image 410 containing only safe colors. The left image in FIG. 4 shows the input image 408 along with the indications of the unsafe colors in this image. The shaded patches 402A-402C show the elements in the input image 408 that have unsafe colors.

The safe color for replacing a corresponding unsafe color can be obtained through a user input. For example, the user interface for presenting the unsafe colors for the visual content 108 can further prompt the designer to select a safe color for each unsafe color in the visual content 108. The safe color for an unsafe color can also be automatically determined by the visual content proofing system 104. For instance, the visual content proofing system 104 can calculate a replacement safe color value in the commonly supported color region that is closer to the unsafe color in the reference color space than any other color in the commonly supported color region as the safe color. The replacement safe color is thus the color value in the commonly supported color region that has the shortest distance to the unsafe color value in the reference color space. This replacement safe color can be found using any known method for finding a point in a three-dimensional region that is closest to a point outside the three-dimensional region in a three-dimensional space.

In some examples, the calculated safe color can be used to directly replace the corresponding unsafe color. In other examples, the calculated safe color is used to replace the corresponding unsafe color after the designer confirms the replacement. The right figure in FIG. 4 shows the revised image 410 generated by replacing the unsafe colors in the input image 408 with safe colors. The generated revised visual content 124 can be rendered accurately by all the target devices examined in process 200.

Computing System Example for Implementing Multi-Device Visual Content Proofing

Figure 5:
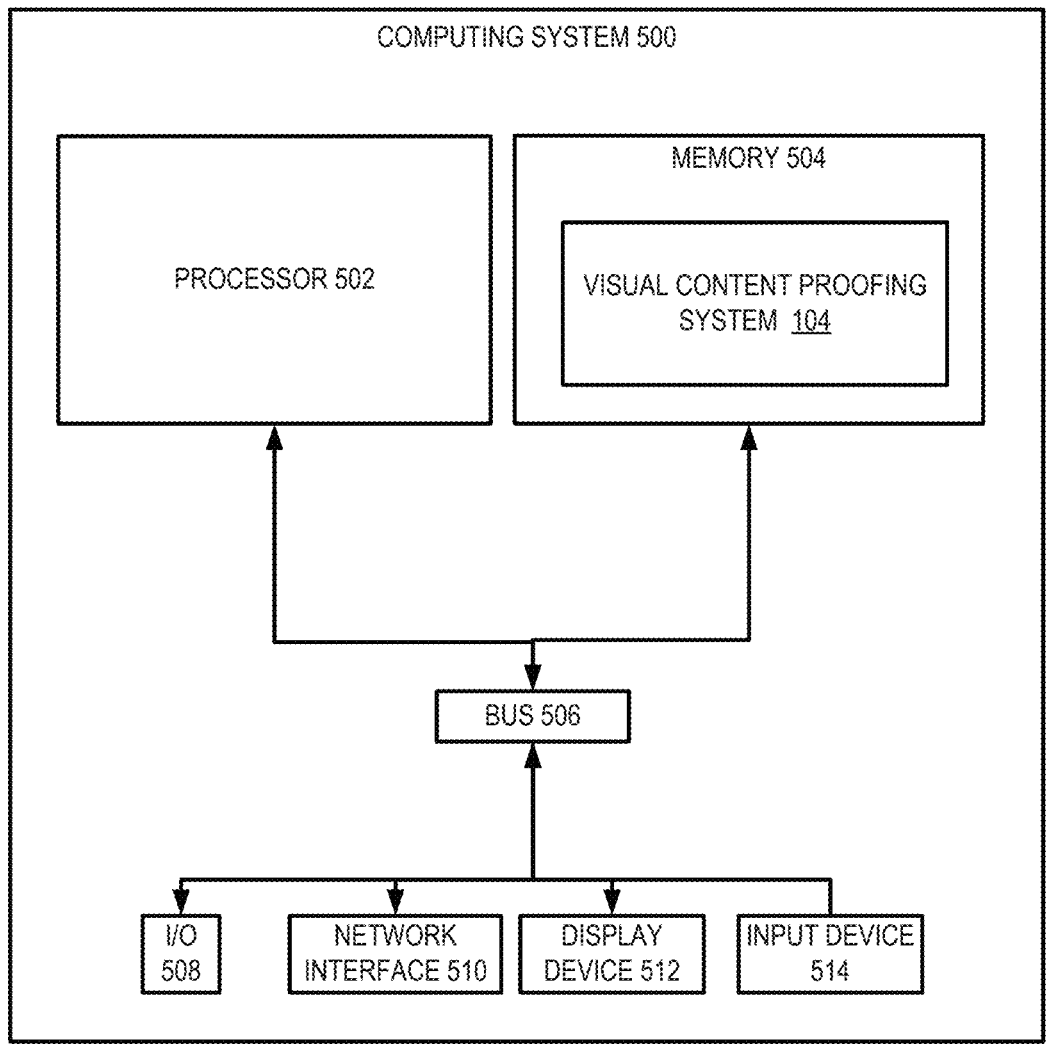
FIG. 5 depicts an example of a computing system that executes a visual content proofing system for performing certain embodiments of the present disclosure.

Any suitable computing system or group of computing systems can be used for performing the operations described herein. For example, FIG. 5 depicts an example of a computing system 500 that can implement the computing environment of FIG. 1. In some embodiments, the computing system 500 includes a processing device 502 that executes the visual content proofing system 104, a memory that stores various data computed or used by the visual content proofing system 104, an input device 514 (e.g., a mouse, a stylus, a touchpad, a touchscreen, etc.), and a display device 512 that displays graphical content generated by the visual content proofing system 104. For illustrative purposes, FIG. 5 depicts a single computing system on which the visual content proofing system 104 is executed, and the input device 514 and display device 512 are present. But these applications, datasets, and devices can be stored or included across different computing systems having devices similar to the devices depicted in FIG. 5.

The depicted example of a computing system 500 includes a processing device 502 communicatively coupled to one or more memory devices 504. The processing device 502 executes computer-executable program code stored in a memory device 504, accesses information stored in the memory device 504, or both. Examples of the processing device 502 include a microprocessor, an application-specific integrated circuit ("ASIC"), a field-programmable gate array ("FPGA"), or any other suitable processing device. The processing device 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, such as an input device 514, a display device 512, or other input or output devices. For example, the computing system 500 is shown with one or more input/output ("I/O") interfaces 508. An I/O interface 508 can receive input from input devices or provide output to output devices. One or more buses 506 are also included in the computing system 500. The buses 506 communicatively couples one or more components of a respective one of the computing system 500.

The computing system 500 executes program code that configures the processing device 502 to perform one or more of the operations described herein. The program code includes, for example, the visual content proofing system 104 or other suitable applications that perform one or more operations described herein. The program code may be resident in the memory device 504 or any suitable computer-readable medium and may be executed by the processing device 502 or any other suitable processor. In some embodiments, all modules in the visual content proofing system 104 are stored in the memory device 504, as depicted in FIG. 5. In additional or alternative embodiments, one or more of these modules from the visual content proofing system 104 are stored in different memory devices of different computing systems.

In some embodiments, the computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and/or the like. The computing system 500 is able to communicate with one or more other computing devices (e.g., a computing device that receives inputs for visual content proofing system 104 or displays outputs of the visual content proofing system 104) via a data network using the network interface device 510.

An input device 514 can include any device or group of devices suitable for receiving visual, auditory, or other suitable input that controls or affects the operations of the processing device 502. Non-limiting examples of the input device 514 include a touchscreen, stylus, a mouse, a keyboard, a microphone, a separate mobile computing device, etc. A display device 512 can include any device or group of devices suitable for providing visual, auditory, or other suitable sensory output. Non-limiting examples of the display device 512 include a touchscreen, a monitor, a separate mobile computing device, etc.

Although FIG. 5 depicts the input device 514 and the display device 512 as being local to the computing device that executes the visual content proofing system 104, other implementations are possible. For instance, in some embodiments, one or more of the input device 514 and the display device 512 can include a remote client-computing device that communicates with the computing system 500 via the network interface device 510 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for proofing visual content against a plurality of target devices comprising:
    obtaining, by a computing device, visual content and a list identifying the plurality of target devices, wherein the visual content is to be rendered by each of the plurality of target devices;
    for each of the plurality of target devices, determining, by the computing device, a supported color region in a reference color space according to a color profile of the target device;
    determining, by the computing device, a commonly supported color region in the reference color space for the plurality of target devices and a design device used for designing the visual content;
    determining, by the computing device, an unsafe color in the visual content using the commonly supported color region; and
    generating, by the computing device, revised visual content by replacing the unsafe color with a safe color in the visual content, wherein the safe color is obtained by calculating a color value in the commonly supported color region that is closer to the unsafe color in the reference color space than another color in the commonly supported color region as the safe color.

2. The computer-implemented method of claim 1, wherein determining the unsafe color in the visual content comprises:
    determining a color of the visual content that falls outside the commonly supported color region in the reference color space as an unsafe color; and
    determining a color of the visual content that falls inside the commonly supported color region in the reference color space as a safe color.

3. The computer-implemented method of claim 1, further comprising generating an indication of the unsafe color for display, which comprises:
    replacing a value of an element in the visual content that has the unsafe color with a pre-determined value to generate a markup visual content.

4. The computer-implemented method of claim 1, wherein the safe color used to replace the unsafe color in the visual content is further obtained by
    receiving an input of the safe color.

5. The computer-implemented method of claim 1, wherein the commonly supported color region for the plurality of target devices and the design device used for designing the visual content is calculated by identifying an intersection of the supported color regions of the plurality of target devices and the design device.

6. The computer-implemented method of claim 1, wherein the plurality of target devices comprise a printing device configured for printing the visual content, a dyeing device configured for dyeing a fabric according to the visual content, or a display device configured for displaying the visual content.

7. The computer-implemented method of claim 1, wherein the reference color space is a CIELAB color space, a HunterLab color space, an XYZ color space, or a red-green-blue (RGB) color space.

8. A system for proofing visual content against a plurality of target devices, comprising:
    a processing device; and a non-transitory computer-readable medium communicatively coupled to the processing device, wherein the processing device is configured to execute program code stored in the non-transitory computer-readable medium and thereby perform operations comprising:

obtaining visual content and a list identifying the plurality of target devices, wherein the visual content is to be rendered by each of the plurality of target devices;

for each of the plurality of target devices, determining a supported color region in a reference color space according to a color profile of the target device;

determining a commonly supported color region in the reference color space for the plurality of target devices and a design device used for designing the visual content;

determining an unsafe color in the visual content using the commonly supported color region; and generating revised visual content by replacing the unsafe color with a safe color in the visual content, wherein the safe color is obtained by calculating a color value in the commonly supported color region that is closer to the unsafe color in the reference color space than another color in the commonly supported color region as the safe color.

9. The system of claim 8, wherein determining the unsafe color in the visual content comprises:

determining a color of the visual content that falls outside the commonly supported color region in the reference color space as an unsafe color; and determining a color of the visual content that falls inside the commonly supported color region in the reference color space as a safe color.

10. The system of claim 8, further comprising generating an indication of the unsafe color for display, which comprises:

replacing a value of an element in the visual content that has the unsafe color with a pre-determined value to generate a markup visual content.

11. The system of claim 8, wherein the safe color used to replace the unsafe color in the visual content is further obtained by:

receiving an input of the safe color.

12. The system of claim 8, wherein the commonly supported color region for the plurality of target devices and the design device used for designing the visual content is calculated by identifying an intersection of the supported color regions of the plurality of target devices and the design device.

13. The system of claim 8, wherein the plurality of target devices comprise a printing device configured for printing the visual content, a dyeing device configured for dyeing a fabric according to the visual content, or a display device configured for displaying the visual content.

14. The system of claim 8, wherein the reference color space is a CIELAB color space, a HunterLab color space, an XYZ color space, or a red-green-blue (RGB) color space.

15. A non-transitory computer-readable medium having program code that is stored thereon, the program code executable by one or more processing devices for performing operations comprising:

obtaining visual content and a list identifying a plurality of target devices, wherein the visual content is to be rendered by each of the plurality of target devices;

for each of the plurality of target devices, determining a supported color region in a reference color space according to a color profile of the target device;

determining a commonly supported color region in the reference color space for the plurality of target devices and a design device used for designing the visual content;

determining an unsafe color in the visual content using the commonly supported color region; and generating revised visual content by replacing the unsafe color with a safe color in the visual content, wherein the safe color is obtained by calculating a color value in the commonly supported color region that is closer to the unsafe color in the reference color space than another color in the commonly supported color region as the safe color.

16. The non-transitory computer-readable medium of claim 15, wherein determining the unsafe color in the visual content comprises:

determining a color of the visual content that falls outside the commonly supported color region in the reference color space as an unsafe color; and determining a color of the visual content that falls inside the commonly supported color region in the reference color space as a safe color.

17. The non-transitory computer-readable medium of claim 15, further comprising generating an indication of the unsafe color for display, which comprises:

replacing a value of an element in the visual content that has the unsafe color with a pre-determined value to generate a markup visual content.

18. The non-transitory computer-readable medium of claim 15, wherein the safe color used to replace the unsafe color in the visual content is further obtained by receiving an input of the safe color.

19. The non-transitory computer-readable medium of claim 15, wherein the commonly supported color region for the plurality of target devices and the design device used for designing the visual content is calculated by identifying an intersection of the supported color regions of the plurality of target devices and the design device.

20. The non-transitory computer-readable medium of claim 15, wherein the plurality of target devices comprise a printing device configured for printing the visual content, a dyeing device configured for dyeing a fabric according to the visual content, or a display device configured for displaying the visual content.

* * * * *